UNITED STATES PATENT OFFICE.

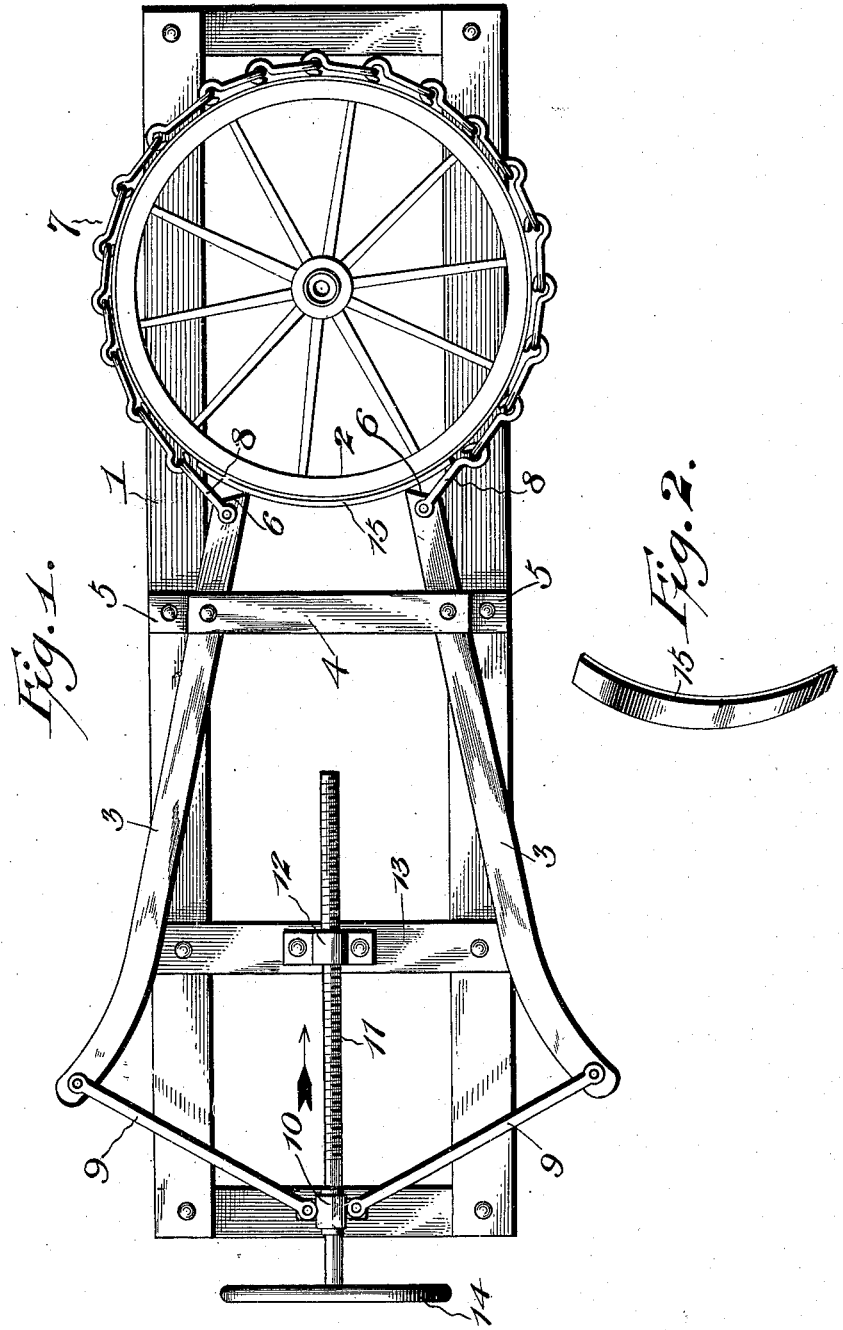

THOMAS R. PANGLE, OF NEW MADRID, MISSOURI, ASSIGNOR OF ONE-HALF TO JAMES R. LEWIS, OF SAME PLACE.

TIRE-SHRINKER.

SPECIFICATION forming part of Letters Patent No. 639,277, dated December 19, 1899.

Application filed September 24, 1898. Serial No. 691,802. (No model.)

*To all whom it may concern:*

Be it known that I, THOMAS R. PANGLE, a citizen of the United States, residing at New Madrid, in the county of New Madrid and State of Missouri, have invented a new and useful Tire-Shrinker, of which the following is a specification.

This invention relates to that class of tire-shrinkers which shrink the tire while on the wheel and employ for that purpose an embracing band or chain, in combination with means for drawing the band tightly around the tire.

The object of the present invention is to provide improved means for drawing the ends of the chain together and also to provide means for protecting the tire from bulging at the point not engaged by the chain.

To attain these objects, the invention consists in a certain construction and combination of parts, as will be hereinafter more fully described, shown in the drawings, and particularly pointed out in the claims.

In the drawings, Figure 1 is a top plan view of the device. Fig. 2 is a detail perspective view of the segmental bar to prevent bulging of the tire.

Similar numerals of reference indicate corresponding parts in both the figures of the drawings.

Referring to the drawings, 1 designates a suitable frame upon which the device is mounted and which supports the wheel 2. Pivoted intermediate their ends and arranged longitudinally of the frame are a pair of levers 3. These levers are arranged at each side of the frame and pivoted between two transverse beams 4 and 5, the lower beam 5 being longer than the upper beam 4 and bolted to the sides of the frame, as shown. The shorter ends of the lever are arranged next to the wheel and are beveled, as at 6, to accommodate themselves to the curvature of the rim of the wheel as the ends are drawn together. A band 7, preferably a chain composed of removable links, as shown, partly surrounds the wheel and is connected to the short ends of the levers by means of hooked links 8, pivoted to the levers. The other ends of the levers are connected by links 9 to a swiveled collar 10, which is carried by a screw 11. The inner end of this screw is confined within a threaded boxing 12, mounted upon a transverse beam 13, and its outer end is provided with a band-wheel 14.

To operate the device, the links 8 are hooked into the ends of the chain 7 and the hand-wheel 14 operated to feed the screw inward in the direction of the arrow, which carries the collar 10 inward and tends to straighten out the links 9, which forces the long ends of levers 3 outward and draws the inner short ends toward each other, which binds the chain 7 tightly around the wheel and compresses the tire thereon.

It will be noted that the portion of the tire between the ends of the levers would have a tendency to bulge outward, as the chain does not confine that portion. To obviate this difficulty, a movable segmental bar 15 is interposed between the ends of the levers and the tire and spanning the unconfined portion thereof between the ends of the chain. This bar rests firmly against the tire and the ends of the levers press against it, and thereby the tire is prevented from bulging.

The arrangement of the screw with its connections between the two levers produces an exceedingly compact and useful device, and the employment of the segmental bar to prevent bulging of the tire is a highly important feature and exceedingly useful improvement over the usual form of tire-shrinkers employing a chain partially surrounding the wheel.

Changes in the form, proportion, and minor details may be made without departing from the spirit and scope or sacrificing any of the advantages of the present invention, and therefore I do not wish to be understood as limiting myself to the precise construction and arrangement as herein described.

Having thus described my invention, what I claim is—

1. In a tire-shrinker, the combination with a band or chain adapted to embrace the tire of a wheel, of a pair of levers pivoted intermediate their ends, each lever having one of its ends connected to the respective end of the band, and means engaging the tire between the ends of the band, the inner ends of the levers having a sliding engagement with said means, whereby the tire is prevented from being bulged by the operation of the device, substantially as shown and described.

2. In a tire-shrinker, the combination with a supporting-frame having a pair of levers pivoted intermediate of their ends, and a band or chain connected to the respective ends of the levers, of a threaded boxing fixedly carried by the frame and located intermediate of the levers, an operating-screw fitted in said boxing and extending longitudinally between the levers, a swiveled collar carried by the screw and held against longitudinal movement thereon, and links pivoted at opposite ends to the swiveled collar and the respective levers, the screw being adapted to carry the swiveled collar inwardly between the levers, whereby the links will force the adjacent ends of the levers apart, substantially as shown and described.

3. In a tire-shrinker, the combination with a band or chain adapted to embrace the tire of a wheel, lever mechanism connecting the ends of the band or chain whereby the latter may be drawn together and compress the same about the tire, of means engaging the unconfined portion of the tire between the ends of the band, whereby the tire is prevented from being bulged by the operation of the device, substantially as set forth.

4. In a tire-shrinker, the combination with a band or chain adapted to embrace the tire of a wheel, of a pair of levers, each lever having one of its ends arranged next to the rim of the wheel between the ends of the chain and connected to one end of the chain, a movable bar interposed between the tire and the adjacent ends of the levers and spanning that portion of the tire between the ends of the chain, the ends of the levers normally bearing against said bar, and means for operating the levers to bind the chain about the rim of the wheel, substantially as and for the purpose set forth.

5. In a tire-shrinker, the combination with a band or chain adapted to embrace the rim of a wheel, of a pair of levers, each lever having one of its ends beveled and arranged next to the rim of the wheel between the ends of the chain and connected to one end thereof, a movable segmental bar interposed between the tire and the beveled ends of the levers and spanning that portion of the tire between the ends of the chain, the beveled ends of the levers normally bearing against the segmental bar, and means for operating said levers to bind the chain about the tire of the wheel, substantially as and for the purpose set forth.

In testimony that I claim the foregoing as my own I have hereto affixed my signature in the presence of two witnesses.

THOMAS R. PANGLE.

Witnesses:
A. J. DAVIS,
W. B. LOULY.